US008094836B2

(12) United States Patent
Chen et al.

(10) Patent No.: US 8,094,836 B2
(45) Date of Patent: Jan. 10, 2012

(54) MULTI-CHANNEL DECODING SYSTEMS CAPABLE OF REDUCING NOISE AND METHODS THEREOF

(75) Inventors: Chieh-Hung Chen, Hsinchu (TW); Tsung-Ling Li, Ping-Tung County (TW); Chia-Huang Fu, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 946 days.

(21) Appl. No.: 12/099,159

(22) Filed: Apr. 8, 2008

(65) Prior Publication Data

US 2009/0252337 A1 Oct. 8, 2009

(51) Int. Cl.
*H04R 5/00* (2006.01)
*H04B 15/00* (2006.01)

(52) U.S. Cl. .......................................... 381/94.1; 381/1

(58) Field of Classification Search ................ 381/1–10, 381/94.1–94.9
See application file for complete search history.

(56) References Cited

U.S. PATENT DOCUMENTS

| | | | |
|---|---|---|---|
| 4,399,325 A | 8/1983 | Tanaka et al. | |
| 4,959,859 A | 9/1990 | Manlove et al. | |
| 2006/0232868 A1 * | 10/2006 | Wu et al. | 360/2 |

* cited by examiner

*Primary Examiner* — Cuong Q Nguyen
(74) *Attorney, Agent, or Firm* — Winston Hsu; Scott Margo

(57) ABSTRACT

A multi-channel decoding method includes: receiving an input signal to generate a first channel output signal and a second channel output signal, wherein the input signal is mixed with a specific clock signal; and gradually changing an amplitude of the specific clock signal from a first value to a second value when switching from a first mode corresponding to a first number of channels to a second mode corresponding to a second number of channels. Systems utilizing the method and another method further comprising calibration are also disclosed.

8 Claims, 8 Drawing Sheets

MULTI-CHANNEL DECODING SYSTEMS CAPABLE OF REDUCING NOISE AND METHODS THEREOF

BACKGROUND

The present invention relates to a multi-channel decoding scheme, and more particularly to a multi-channel decoding system capable of reducing noise when switching between different channel modes, and method thereof.

Generally speaking, when a multi-channel decoding system switches from a multi-channel mode to a single-channel mode or from the single-channel mode to the multi-channel mode, users often hear a "pop" noise from their earphones or speakers. This is primarily because the output DC voltage levels of a channel output signal in the multi-channel and single-channel modes, which is generated from the multi-channel decoding system, are different. Another reason may result from the Glitch phenomenon during switching between the multi-channel and single-channel modes. Taking a stereo decoding system as an example, the pop noise is usually heard by human when the stereo decoding system switches between stereo and mono modes.

Please refer to FIG. 1 in conjunction with FIG. 2. FIG. 1 is a diagram of a related art stereo decoding system 100, and FIG. 2 is a timing diagram illustrating a clock signal $S_{CLK}$ having a frequency 38 KHz, a mode switching signal $S_{MODE}$, and a clock signal $S_{CLK}'$. As shown in FIG. 1, the stereo decoding system 100 comprises a decoding circuit 105 and a clock generating circuit 110, where the decoding circuit 105 further includes a mixer 115, voltage-to-current (V/I) converters 120*a* and 120*b*, a separation module 125, operational amplifiers $OP_1$ and $OP_2$, resistor units 130*a* and 130*b*, and low pass filters (LPFs) 135*a* and 135*b*. The decoding circuit 105 is utilized for receiving an input audio signal $S_{in}$ to generate a left channel output signal LOUT and a right channel output signal ROUT according to the clock signal $S_{CLK}'$. When the mode switching signal $S_{MODE}$ is at a high logic level, it indicates that the stereo decoding system 100 is in the stereo mode; when the mode switching signal $S_{MODE}$ is at a low logic level, this indicates that the stereo decoding system 100 is in the mono mode.

Ideally, the DC voltage level of the channel output signal LOUT or ROUT should be identical whether the stereo decoding system 100 is in the stereo mode or the mono mode. Practically, however, an equivalent offset voltage source $V_{os}$ exists within the decoding circuit 105 and the DC voltage level of the channel output signal LOUT/ROUT in the stereo and mono modes are different due to the offset voltage source $V_{os}$. For example, in stereo mode, a voltage of the offset voltage source $V_{os}$ is equal to $V_1$; in mono mode, the voltage of the offset voltage source $V_{os}$ will become $V_2$. Consequently, the DC voltage level of the channel output signal LOUT/ROUT is changed while the stereo decoding system 100 switches from mono mode to stereo mode and the above-mentioned pop noise is thus introduced.

SUMMARY

It is therefore one of the objectives of the present invention to provide a multi-channel decoding system and related method capable of reducing the noise, to solve the above-mentioned problems.

According to an embodiment of the present invention, a multi-channel decoding system is disclosed. The multi-channel decoding system comprises a decoding circuit and a clock generating circuit. The decoding circuit is utilized for receiving an input signal to generate a first channel output signal and a second channel output signal. The decoding circuit has a mixer used for mixing the input signal with a specific clock signal. The clock generating circuit is utilized for generating the specific clock signal and arranged to gradually change an amplitude of the specific clock signal from a first value to a second value when receiving a mode switching signal instructing a switching from a first mode corresponding to a first number of channels to a second mode corresponding to a second number of channels.

According to the embodiment of the present invention, a multi-channel decoding method is disclosed. The multi-channel decoding method comprises the following steps: receiving an input signal to generate a first channel output signal and a second channel output signal, wherein the input signal is mixed with a specific clock signal; and gradually changing an amplitude of the specific clock signal from a first value to a second value when switching from a first mode corresponding to a first number of channels to a second mode corresponding to a second number of channels.

According to another embodiment of the present invention, a multi-channel decoding system is disclosed. The multi-channel decoding system comprises a decoding circuit, a test signal generating circuit, and a calibration circuit. The decoding circuit is utilized for receiving an input signal to generate a channel output signal, and the test signal generating circuit is utilized for providing a first test signal serving as the input signal in a first calibration mode. The calibration circuit is utilized for adjusting a DC voltage level of the channel output signal outputted by the decoding circuit with a first calibration signal by reducing a difference between a first predetermined reference signal level and a DC voltage level of the channel output signal generated from the first test signal.

According to the embodiment of the present invention, a multi-channel decoding method is disclosed. The multi-channel decoding method comprises the following steps: receiving an input signal to generate a channel output signal; providing a first test signal serving as the input signal in a first calibration mode; and adjusting a DC voltage level of the channel output signal outputted by the decoding circuit with a first calibration signal by reducing a difference between a first predetermined reference signal level and a DC voltage level of the channel output signal generated from the first test signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
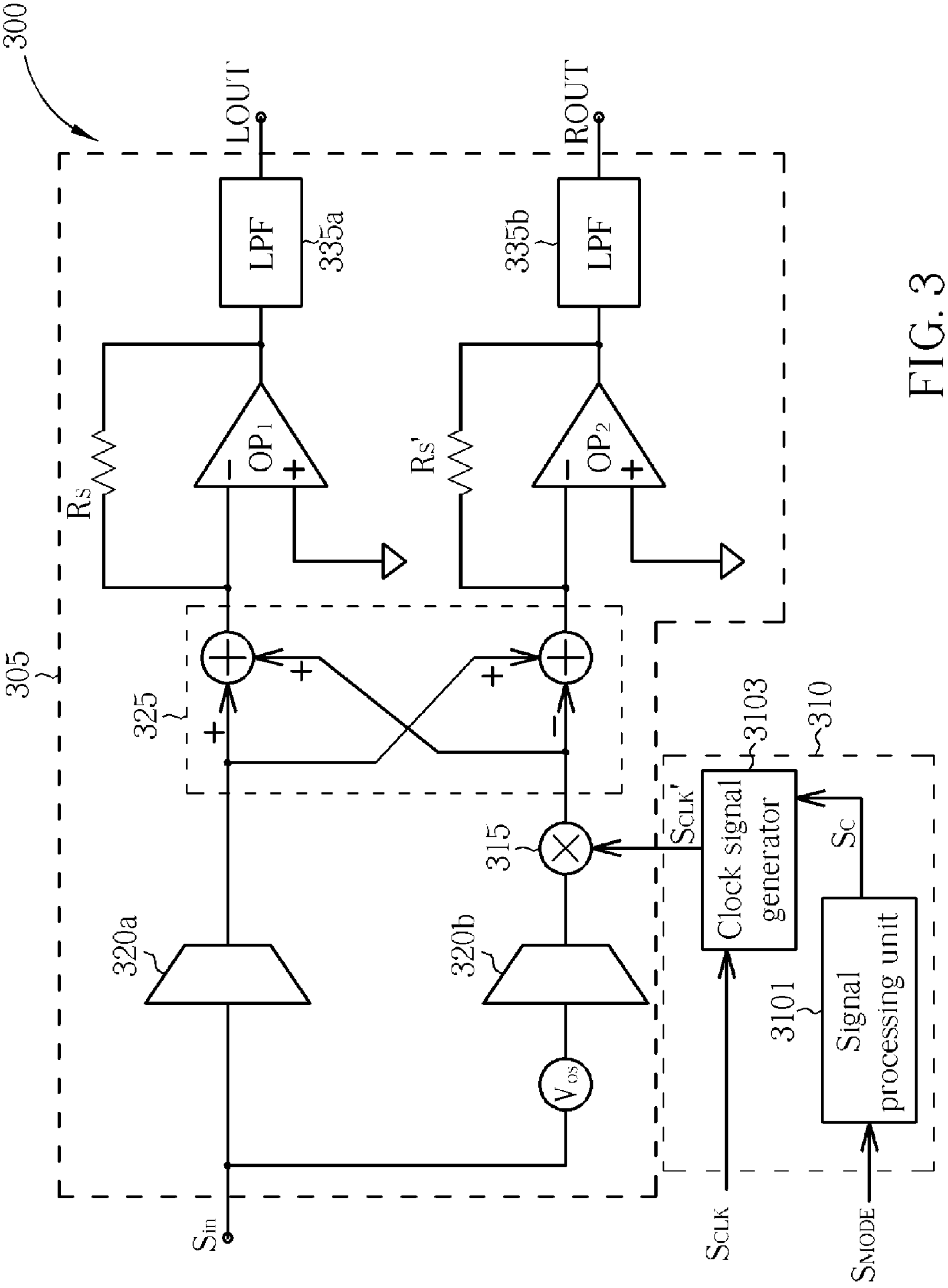
FIG. 3 is a diagram of a multi-channel decoding system according to a first embodiment of the present invention.

FIG. 3 is a diagram of a multi-channel decoding system 300 according to a first embodiment of the present invention. The multi-channel decoding system 300 includes a decoding circuit 305 and a clock generating circuit 310. The decoding circuit 305 is utilized for receiving an input signal $S_{in}$ to generate at least a first channel output signal (e.g. a left channel output signal LOUT) and a second channel output signal (e.g. a right channel output signal ROUT); other operations and functions of decoding circuit 305 are similar to those of the decoding circuit 105 and not detailed for brevity. The clock generating circuit 310 is utilized for generating a specific clock signal $S_{CLK}'$ and for gradually changing the amplitude of the specific clock signal $S_{CLK}'$ from a first value to a second value when switching from a first mode to a second mode, such as receiving a mode switching signal $S_{MODE}$ instructing a switching from the first mode corresponding to a first number of channels to the second mode corresponding to a second number of channels. For instance, the clock generating circuit 310 gradually changes the amplitude of the specific clock signal $S_{CLK}'$ from a specific value to substantially zero or from substantially zero to the specific value when switching happens. In this embodiment, the multi-channel decoding system 300 is a stereo decoding system; the first mode and the second mode are respectively meant to be a stereo mode and a mono mode. More specifically, the clock generating circuit 310 further includes a signal processing unit 3101 and a clock signal generator 3103. The signal processing unit 3101 generates a control signal $S_c$ according to the mode switching signal $S_{MODE}$. Particularly, when the mode switching signal $S_{MODE}$ instructs the switching between the stereo and mono modes, the signal processing unit 3101 generates the control signal $S_c$ having a gradual transition from a first level to a second level, where one of the first and second levels is a low level (e.g. zero) and the other is a high level. The clock signal generator 3103 is utilized for generating the specific clock signal $S_{CLK}'$ according to a predetermined reference clock signal $S_{CLK}$ and the control signal $S_c$. In practice, the clock signal generator 3103 can be implemented by a multiplier used for combining the predetermined reference clock signal $S_{CLK}$ and the control signal $S_c$ to generate the specific clock signal $S_{CLK}'$.

Figure 1:
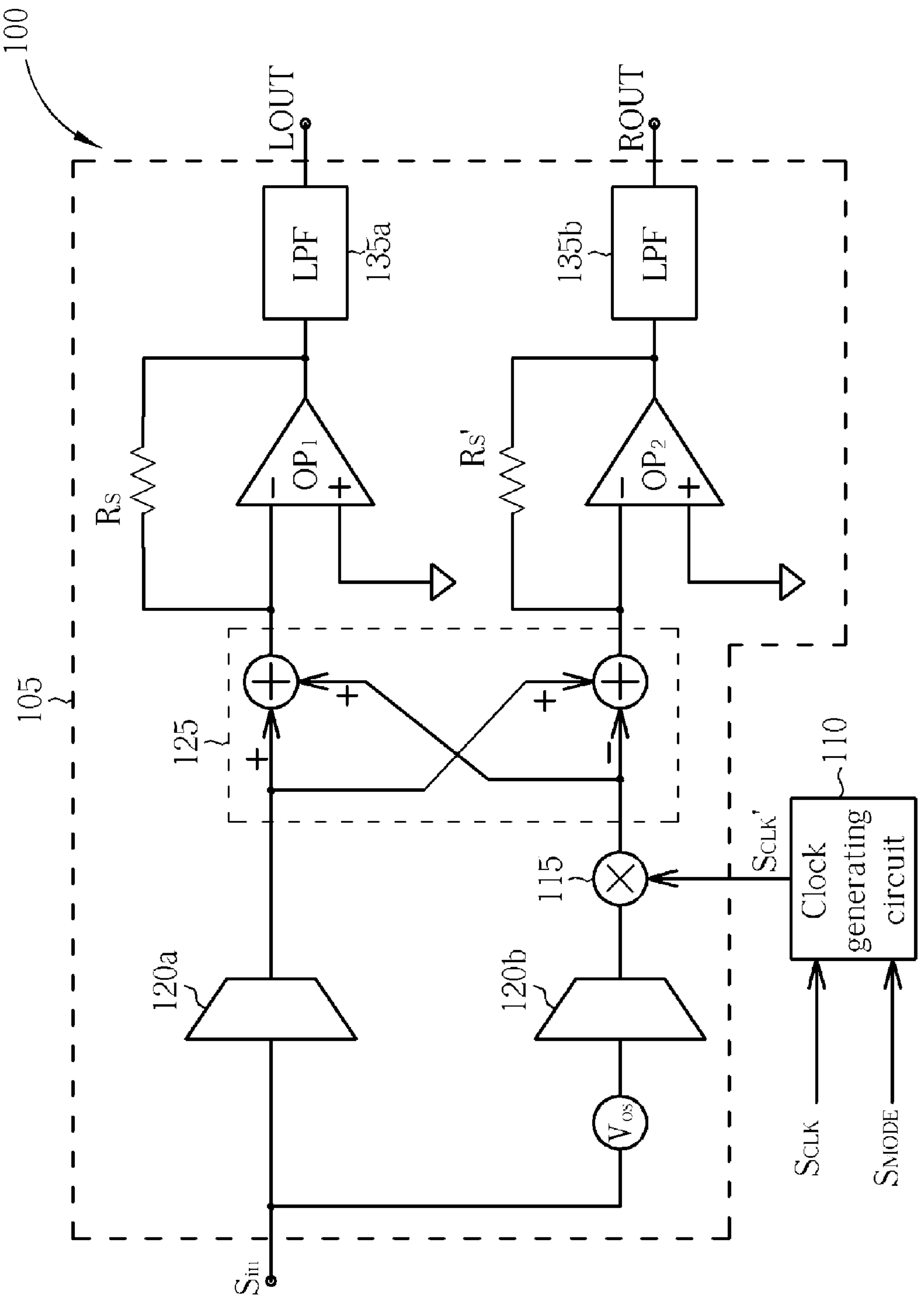
FIG. 1 RELATED ART
FIG. 1 is a diagram of a related art stereo decoding system.
Figure 2:
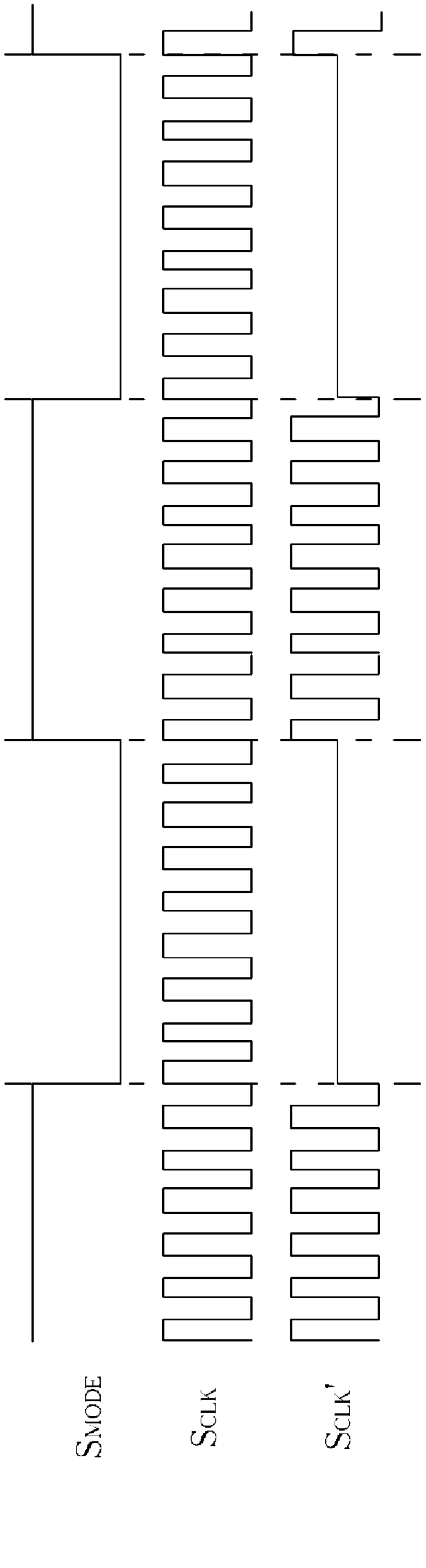
FIG. 2 RELATED ART
FIG. 2 is a timing diagram illustrating a clock signal $S_{CLK}$, a mode switching signal $S_{MODE}$, and a clock signal $S_{CLK}'$ shown in FIG. 1.
Figure 4:
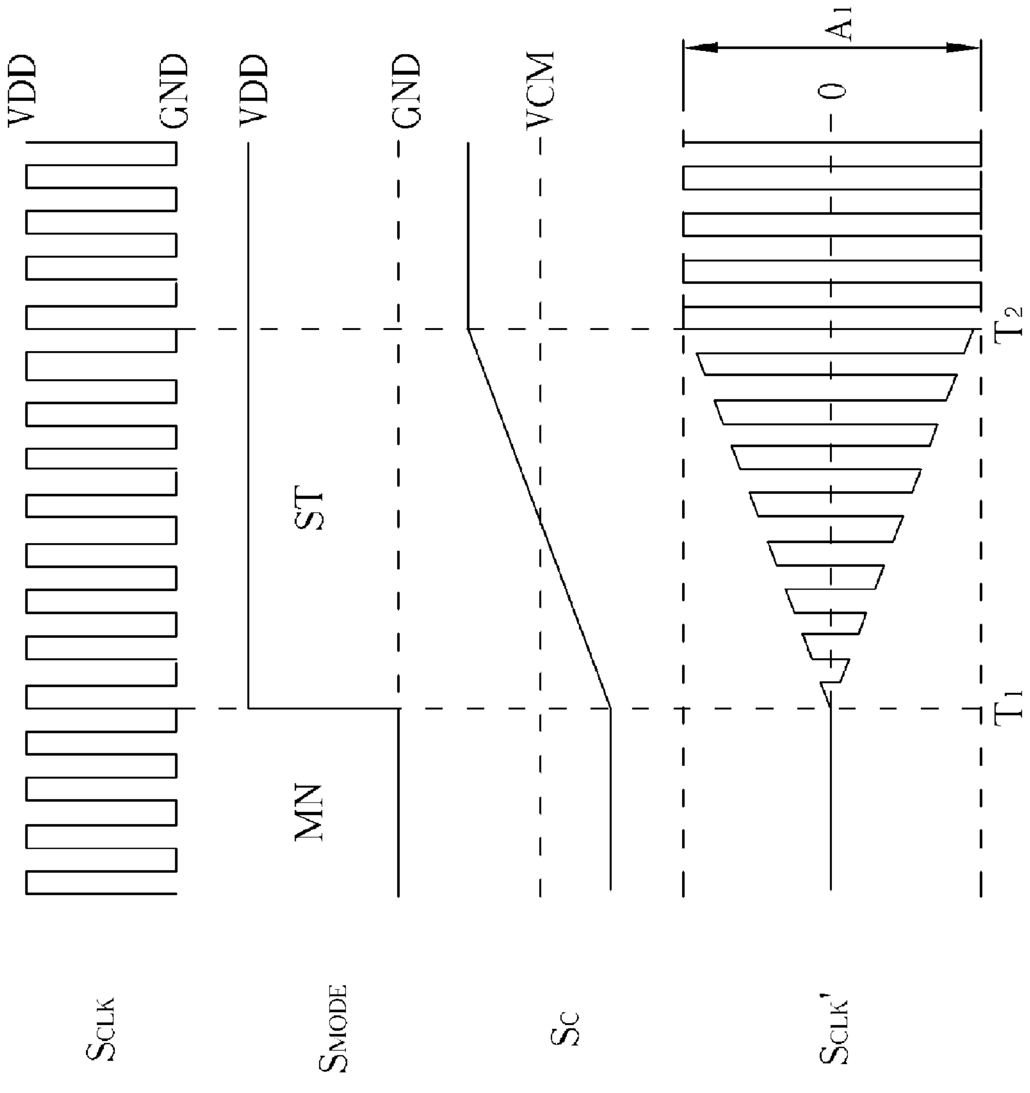
FIG. 4 is a timing diagram illustrating an example of a predetermined reference clock signal $S_{CLK}$, a mode switching signal $S_{MODE}$, a control signal $S_c$, and a specific clock signal $S_{CLK}'$ shown in FIG. 3.

As mentioned above, the noise resulting from the equivalent offset voltage source $V_{os}$ is easily heard if a conventional multi-channel decoding system, such as the system 100 of FIG. 1, abruptly switches from stereo mode to mono mode or vice versa. In the first embodiment, the mode switching signal $S_{MODE}$ originally having sharp transitions is processed by the signal processing unit 3101, such that the control signal $S_c$ having gradual transitions is generated. The clock signal generator 3103 then generates the specific clock signal $S_{CLK}'$ which also has gradual transitions according to the predetermined reference clock signal $S_{CLK}$ (usually has a frequency 38 KHz) and the control signal $S_c$. Taking an example of the multi-channel decoding system 300 switching from the stereo mode to the mono mode, a timing diagram regarding the control signal $S_c$ and specific clock signal $S_{CLK}'$ is illustrated in FIG. 4. As shown in FIG. 4, when the mode switching signal $S_{MODE}$ instructs a switching from the mono mode (MN) to the stereo mode (ST) at timing $T_1$, the control signal $S_c$ gradually transits from a low level to a high level before timing $T_2$; in this example, the waveform of the control signal $S_c$ during timing $T_1$ to $T_2$ looks substantially linear. However, gradually linear transition is not intended to be a limitation of the present invention. The clock signal generator 3103 then multiplies the predetermined reference clock signal $S_{CLK}$ by the control signal $S_c$ to generate the specific clock signal $S_{CLK}'$. Obviously, it is shown that the amplitude of the specific clock signal $S_{CLK}'$ is increased (from zero to $A_1$) gradually during timing $T_1$ to $T_2$. Accordingly, although the DC voltage level of the channel output signal LOUT or ROUT is different in the stereo mode and mono mode, the noise is not easily perceived by human since the multi-channel decoding system 300 does not switch rapidly from the mono mode to stereo mode. Similarly, when the mode switching signal $S_{MODE}$ instructs a switching from the stereo mode (ST) to the mono mode (MN), the control signal $S_c$ also gradually transits from the high level to the low level and therefore the amplitude of the specific clock signal $S_{CLK}'$ is not rapidly decreased (from $A_1$ to substantially zero). A detailed description is not explained for brevity.

Figure 5:
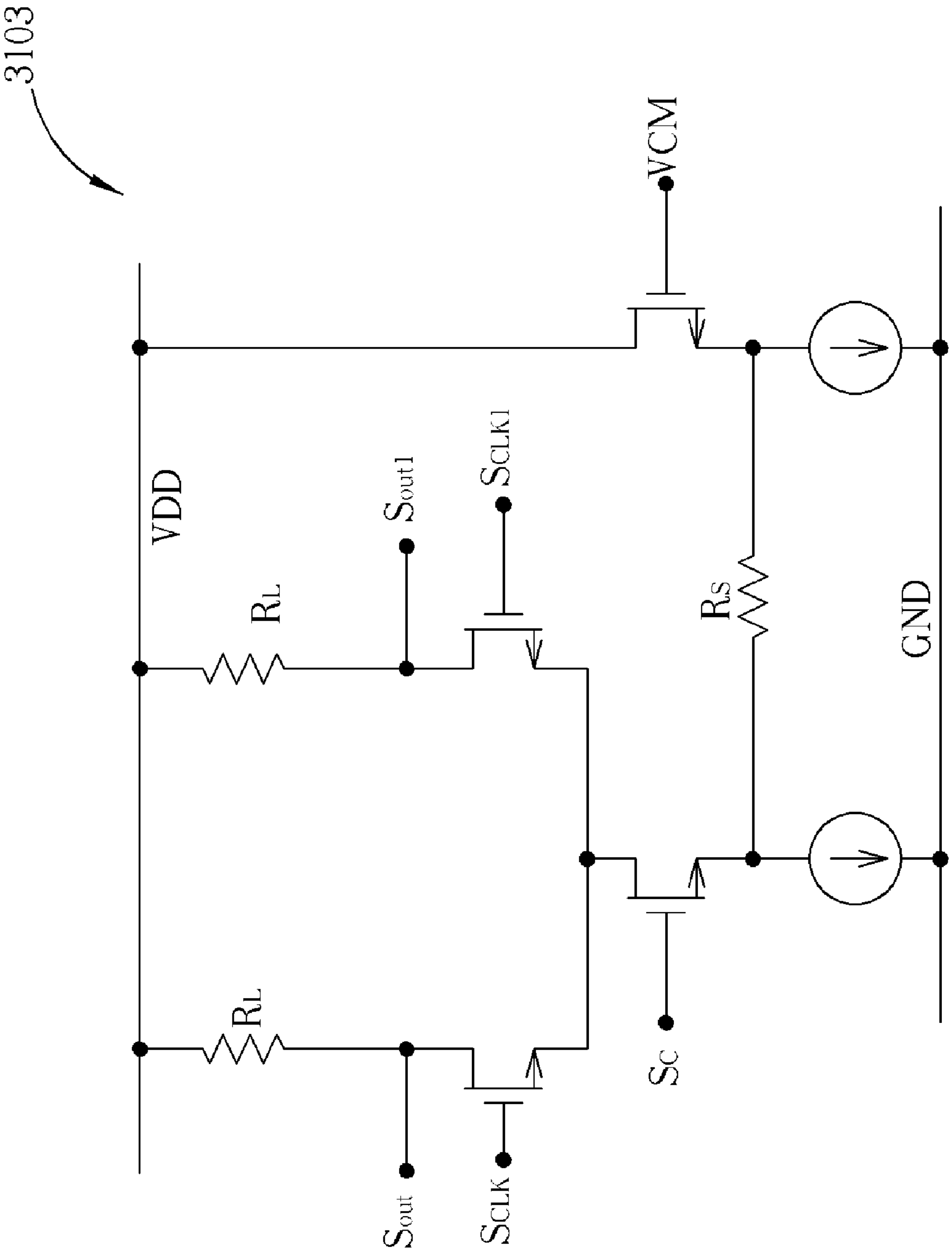
FIG. 5 is a diagram of a particular example of a clock signal generator shown in FIG. 3.

Moreover, another example of the clock signal generator 3103 is shown in FIG. 5. A signal $S_{CLK1}$ is meant to be an inverse signal of the predetermined reference clock signal $S_{CLK}$ and a voltage VCM is a common mode voltage. The specific clock signal $S_{CLK}'$ shown in FIG. 3 comprises output signals $S_{out}$ and $S_{out1}$. For those skilled in this art, it should be well-known to appreciate the operation of the circuit (i.e. the clock signal generator 3103) shown in FIG. 5 and it is not illustrated for simplicity.

Figure 6:
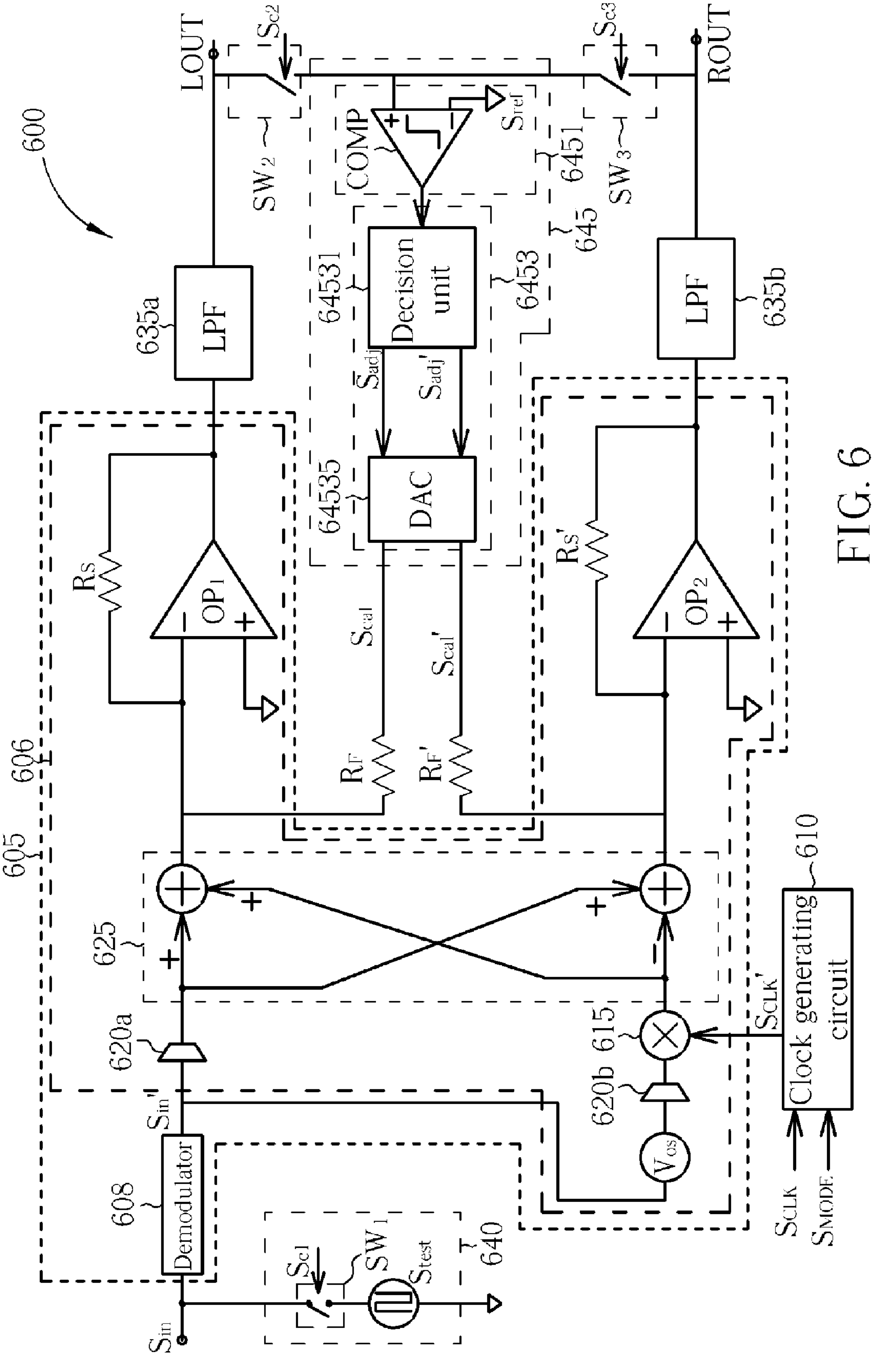
FIG. 6 is a schematic diagram of a multi-channel decoding system according to a second embodiment of the present invention.

Please refer to FIG. 6. FIG. 6 is a schematic diagram of a multi-channel decoding system 600 according to a second embodiment of the present invention. As shown in FIG. 6, the multi-channel decoding system 600 comprises a decoding circuit 605, a clock generating circuit 610, a test signal generating circuit 640, and a calibration circuit 645, where the decoding circuit 605 further comprises a signal processing module 606 and a demodulator 608. The test signal generating circuit 640 is utilized for providing a first test signal in a first calibration mode and providing a second test signal in a second calibration mode. In this embodiment, the first and second test signals are identical square wave signals and are both called $S_{test}$. The test signal $S_{test}$ is served as an input signal for the decoding circuit 605 in the first and second calibration modes. However, providing the same test signal $S_{test}$ for two different calibration modes is not intended to be a limitation of the present invention. Moreover, the first and second calibration modes are respectively meant to be a stereo mode and a mono mode when calibrating DC voltage levels of channel output signals LOUT and ROUT. The demodulator 608 demodulates the test signal $S_{test}$ into a DC signal $S_{in}$', and then the signal processing module 606 generates the channel output signals LOUT and ROUT. Since operation and function of the signal processing module 606 are respectively similar to those of the decoding circuit 105, these are not detailed for brevity. Moreover, the clock generating circuit 610 can be the conventional clock generating circuit 110 in FIG. 1 whose specific clock signal $S_{CLK}$' has sharp transitions, or the clock generating circuit 310 in FIG. 3 whose specific clock signal $S_{CLK}$' has gradual transitions. Of course, it is assumed that an equivalent offset voltage source $V_{os}$ also exists within the decoding circuit 605.

After the decoding circuit 605 outputs the channel output signals LOUT and ROUT generated from the test signal $S_{test}$, the calibration circuit 645 outputs a first calibration signal $S_{cal}$ and a second calibration signal $S_{cal}$'into the decoding circuit 605 according to the channel output signals LOUT and ROUT, so as to respectively adjust DC voltage levels of the channel output signals LOUT and ROUT in the stereo and mono modes, for example, by separately reducing the difference between the DC voltage level of the channel output signal LOUT generated from the first test signal $S_{test}$ and a first predetermined reference signal level $S_{ref}$ (e.g. ground level) with the first calibration signal $S_{cal}$ and reducing a difference between the DC voltage level of the channel output signal ROUT generated from the second test signal $S_{test}$ and a second predetermined reference signal level $S_{ref}$' (e.g. ground level) with the second calibration signal $S_{cal}$'. In this embodiment, the first and second predetermined reference signal level $S_{ref}$ and $S_{ref}$' inputted into a comparison module 6451 are designed to become identical. That is, the DC voltage levels of the channel output signals LOUT and ROUT are adjusted to be close to the same predetermined reference signal level whether in stereo or mono mode. In the following description, for simplicity, the first predetermined reference signal level $S_{ref}$ is used for illustrative purposes. Even though the multi-channel decoding system 600 suddenly switches between the stereo mode and mono mode, the noise due to the equivalent offset voltage source $V_{os}$ can be therefore reduced and not easily perceived by human.

The calibration circuit 645 comprises a comparison module 6451 and a decision module 6453. The comparison module 6451 is used for comparing the DC voltage level of the channel output signal LOUT/ROUT with the predetermined reference signal level $S_{ref}$, to output a first comparison result in the stereo mode and a second comparison result in the mono mode, respectively. In this embodiment, the comparison module 6451 is implemented by a comparator COMP, where an inverting input terminal of the comparator COMP is coupled to the predetermined reference signal level $S_{ref}$ while a non-inverting input terminal of the comparator COMP is coupled to the channel output signal LOUT/ROUT switched by switches $SW_2$ and $SW_3$, as shown in FIG. 6. The decision module 6453 is utilized for separately adjusting the first calibration signal $S_{cal}$ and the second calibration signal $S_{cal}$'according to the first comparison result and the second comparison result. In this embodiment, the decision module 6453 comprises a decision unit 64531 and a digital-to-analog converter (DAC) 64535. The decision unit 64531 is utilized for determining a first adjusting signal $S_{adj}$ and a second adjusting signal $S_{adj}$' according to the first and second comparison results respectively, and the DAC 64535 is used for converting the first and second adjusting signals $S_{adj}$ and $S_{adj}$' into a first voltage $V_L$ and a second voltage $V_R$ serving as the first and second calibration signals $S_{cal}$ and $S_{cal}$'respectively. More specifically, the first and second adjusting signals $S_{adj}$ and $S_{adj}$' can be digital codes, and the DAC 64535 converts the digital codes, e.g. first and second adjusting signals $S_{adj}$ and $S_{adj}$', into the first voltage $V_L$ and the second voltage $V_R$.

Furthermore, the decision unit 64531 may utilize a digital successive-approximation algorithm to determine the first and second adjusting signals $S_{adj}$ and $S_{adj}$'; of course, other approximation algorithms can also be applied to the embodiments of the present invention. In this embodiment, the values of the resistors $R_S$, $R_S$', $R_F$, and $R_F$' are designed carefully so that the voltage levels of the channel output signals LOUT and ROUT are compensated. For example, in order to compensate the voltage level of the channel output signal LOUT, the values of the resistors $R_S$ and $R_F$ are designed such that the value of the first voltage $V_L$ equals a specific value associated with the equivalent offset voltage of the channel output signal LOUT, which is illustrated in Equation (1):

$$V_L = \left(1 + \frac{R_F}{R_S}\right) \times V_{os1}, \qquad \text{Equation (1)}$$

where the value $V_{osl}$ is indicative of the voltage level of the channel output signal LOUT before calibrated, i.e. the equivalent offset voltage. Through the calibration, the voltage level (DC voltage) of the channel output signal LOUT is therefore adjusted to become almost zero.

Similarly, for compensating the voltage level of the channel output signal ROUT, the values of the resistors $R_S$' and $R_F$' are designed such that the value of the first voltage $V_R$ equals a specific value associated with the equivalent offset voltage of the channel output signal ROUT, which is illustrated in Equation (2):

$$V_R = \left(1 + \frac{R'_F}{R'_S}\right) \times V_{osr}, \qquad \text{Equation (2)}$$

where the value $V_{osr}$ is indicative of the voltage level of the channel output signal ROUT before calibrated, i.e. the equivalent offset voltage. Through the calibration, the voltage level (DC voltage) of the channel output signal ROUT is also adjusted to become almost zero.

Figure 7:
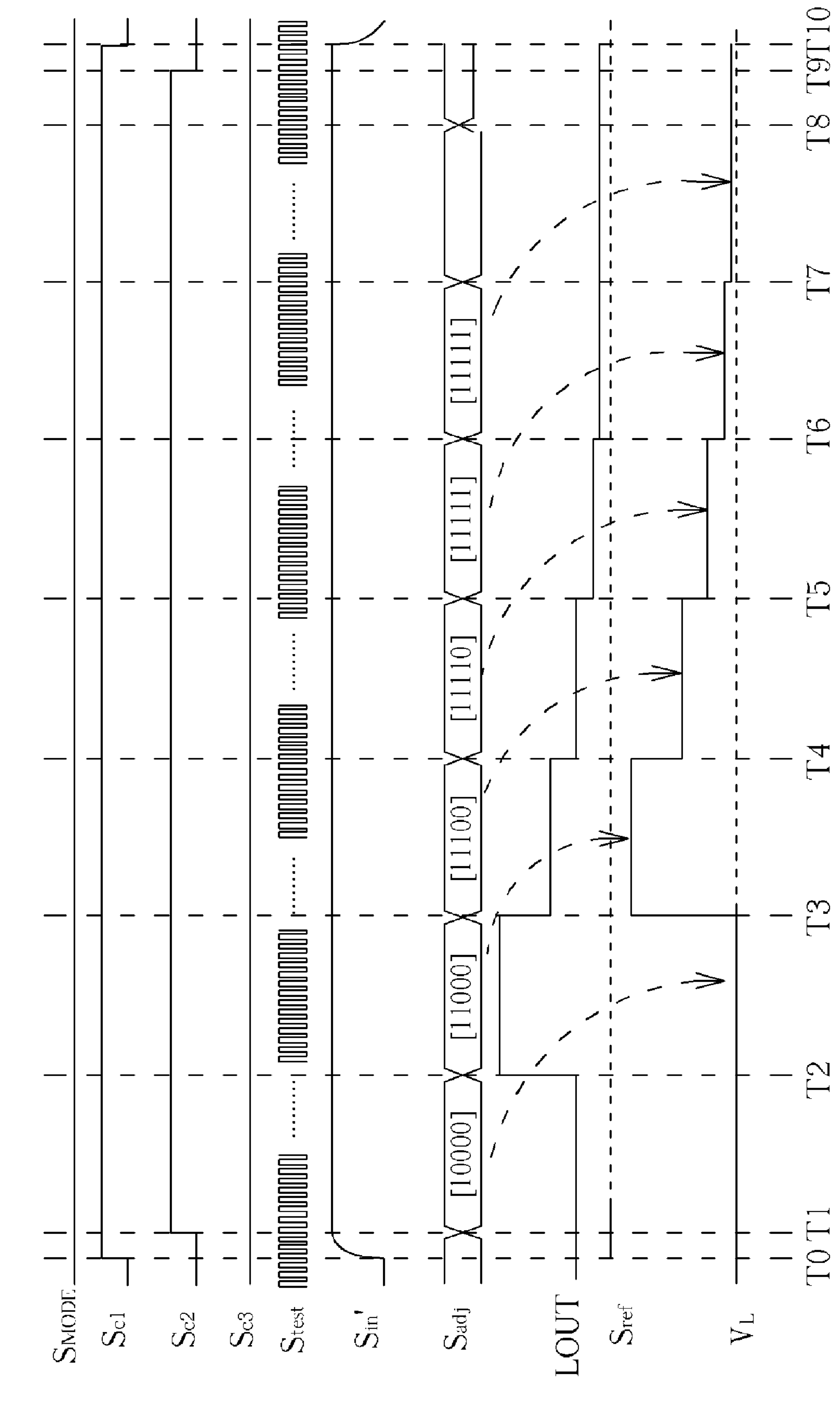
FIG. 7 is a timing diagram illustrating an example of a calibration process for the DC voltage level of the channel output signal LOUT in the mono mode according to the second embodiment of the present invention.

Please refer to FIG. 7. FIG. 7 is a timing diagram illustrating an example of a calibration process for the DC voltage level of the channel output signal LOUT in mono mode according to the second embodiment of the present invention. A control signal $S_{c1}$ is utilized for controlling a status of a switch $SW_1$ shown in FIG. 6; when the control signal $S_{c1}$ transits from a low level to a high level at timing T0, the switch $SW_1$ is turned on. Next, at timing T1, a control signal $S_{c2}$ for switch $SW_2$ of FIG. 6 also transits from a low level to a high level and the calibration process for the channel output signal LOUT in the mono mode is enabled. Initially, the first adjusting signal $S_{adj}$ equaling a code '10000' corresponds to the first voltage $V_1$ equaling zero. When the DC voltage level of the channel output signal LOUT is higher than the predetermined reference signal level $S_{ref}$, such as in a time period from T2 to T3, the first adjusting signal $S_{adj}$ is to be another code '11000' to raise the first voltage $V_1$ for decreasing the DC voltage level of the channel output signal LOUT (e.g. during timing T3 to T4). Otherwise, if the DC voltage level of the channel output signal LOUT is lower than the predetermined reference signal level $S_{ref}$, the first adjusting signal $S_{adj}$ will be adjusted to lower the first voltage $V_1$ for increasing the DC voltage level of the channel output signal LOUT. In this example, the DC voltage level of the channel output signal LOUT is gradually decreased and finally is close to the predetermined reference signal level $S_{ref}$. The decision unit 64531 then records the first adjusting signal $S_{adj}$ finally determined (e.g. the code '11111' in this example). The first adjusting signal $S_{adj}$ is then applied in the signal processing module 606 when the multi-channel decoding system 600 receives an input audio signal instead of the test signal $S_{test}$ to generate the channel output signal in the mono mode. A detailed procedure of how the first and second calibration signals $S_{cal}$ and $S_{cal}$'change the DC voltage levels of the channel output signals LOUT and ROUT is well-known to those skilled in this art, and further description is omitted for simplicity.

Figure 8:
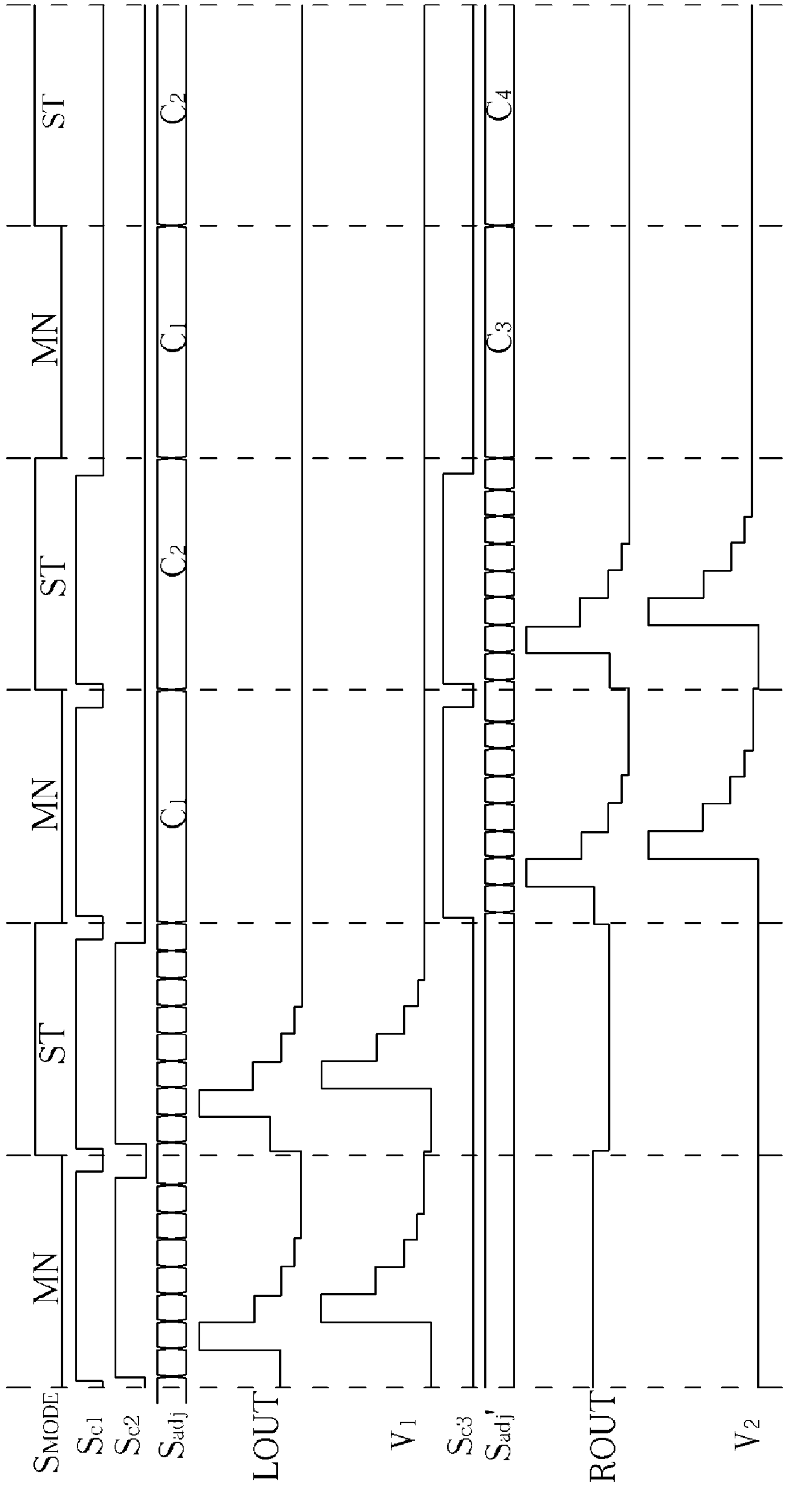
FIG. 8 is a timing diagram showing calibration processes for the DC voltage level of the channel output signals LOUT and ROUT in the mono and stereo modes, respectively.

A calibration process for the DC voltage level of the channel output signal LOUT in stereo mode or for the DC voltage level of the channel output signal ROUT in mono/stereo mode is similar to the above-mentioned calibration process shown in FIG. 7. Please refer to FIG. 8. FIG. 8 is a timing diagram showing the calibration processes for the DC voltage level of the channel output signals LOUT and ROUT in mono and stereo modes, respectively. Codes $C_1$ and C2 are in the first adjusting signal $S_{adj}$ finally determined by the decision unit 64531 for the mono mode and stereo mode, respectively. Codes $C_3$ and $C_4$ are in the second adjusting signal $S_{adj}$' finally determined by the decision unit 64531 for the mono mode and stereo mode, respectively. Further description is not detailed here for brevity. Obviously, through the calibration processes, the DC voltage level of the channel output signal LOUT whether in mono or stereo mode is very close to the predetermined reference signal level $S_{ref}$, and the DC voltage level of the channel output signal ROUT is also close to the predetermined reference signal level $S_{ref}$ whether in mono or stereo mode. Consequently, the problem caused by the pop noise due to the equivalent offset voltage source $V_{os}$ can be solved.

Additionally, in another embodiment, if calibrating only the DC voltage level of the channel output signal LOUT or ROUT is considered, then the calibration circuit 645 can only output the first calibration signal $S_{cal}$ or the second calibration signal $S_{cal}$'into the decoding circuit 605 according to the channel output signal LOUT or ROUT to adjust the DC voltage level of the channel output signal LOUT or ROUT in the mono and stereo modes. This also helps to reduce the pop noise caused by the equivalent offset voltage source $V_{os}$.

Those skilled in the art will readily observe that numerous modifications and alterations of the device and method may be made while retaining the teachings of the invention.

What is claimed is:

1. A multi-channel decoding system, comprising:

a decoding circuit, for receiving an input signal to generate a first channel output signal and a second channel output signal, wherein the decoding circuit has: a mixer, for mixing the input signal with a specific clock signal; and a clock generating circuit, for generating the specific clock signal, wherein the clock generating circuit is arranged to gradually change an amplitude of the specific clock signal from a first value to a second value when receiving a mode switching signal instructing a switching from a first mode corresponding to a first number of channels to a second mode corresponding to a second number of channels.

2. The multi-channel decoding system of claim 1, wherein the input signal is an audio signal, one of the first mode and the second mode is a mono mode, and one of the first value and the second value is substantially zero.

3. The multi-channel decoding system of claim 1, wherein the clock generating circuit comprises:

a signal processing unit, for generating a control signal according to the mode switching signal, wherein when the mode switching signal instructs the switching from the first mode to the second mode, the signal processing unit generates the control signal having a gradual transition from a first level to a second level; and a clock signal generator, for generating the specific clock signal according to a predetermined reference clock signal and the control signal.

4. The multi-channel decoding system of claim 3, wherein the clock signal generator comprises a multiplier for combining the predetermined reference clock signal and the control signal to generate the specific clock signal.

5. A multi-channel decoding method, comprising:

receiving an input signal to generate a first channel output signal and a second channel output signal, wherein the input signal is mixed with a specific clock signal; and gradually changing an amplitude of the specific clock signal from a first value to a second value when switching from a first mode corresponding to a first number of channels to a second mode corresponding to a second number of channels.

6. The multi-channel decoding method of claim 5, wherein the input signal is an audio signal, one of the first mode and the second mode is a mono mode, and one of the first value and the second value is substantially zero.

7. The multi-channel decoding method of claim 5, wherein the step of gradually changing the amplitude of the specific clock signal comprises:

generating a control signal having a gradual transition from a first level to a second level when switching from the first mode to the second mode; and generating the specific clock signal according to a predetermined reference clock signal and the control signal.

8. The multi-channel decoding method of claim 7, wherein the step of generating the specific clock signal comprises:

multiplying the predetermined reference clock signal by the control signal to generate the specific clock signal.

* * * * *